Patented July 9, 1929.

1,720,052

UNITED STATES PATENT OFFICE.

ROBERT AMES NORTON, OF CRAFTON, PENNSYLVANIA, ASSIGNOR TO THE SELDEN COMPANY, OF PITTSBURGH, PENNSYLVANIA, A CORPORATION OF DELAWARE.

PRODUCTION OF NONTURBID ALDEHYDE CONDENSATION PRODUCTS.

No Drawing. Application filed March 12, 1928. Serial No. 261,179.

This invention relates to the production of relatively nonturbid, and under favorable conditions transparent or translucent, relatively insoluble and infusible products from aldehyde condensation products.

A number of important condensation products of aldehydes have been used in the past, such as for example the reaction products of phenols and formaldehyde, or its polymers (bakelite type of resins), the condensation products of cyclic aldehydes and phenols such as the phenol furfural type of resins, the aldehyde urea resins and their derivatives. To this list may also be added some of the aldehyde amine resins, etc. In general the production of aldehyde condensation products is effected by condensing the aldehydes with the other resinophoric groups used in the presence of an alkaline catalyst or condensing agent such as the caustic alkalis, alkali metal carbonates, and the like. Resinous products are obtained of various degrees of plasticity, which are then capable of hardening by heat, being transformed into relatively infusible, insoluble and in many cases very strong and hard products. The first reaction to the intermediate products results in the formation of water of condensation in most cases, and especially when formaldehyde is used the condensation normally takes place in a water solution. The water is then usually removed by suitable methods such as, for example, by distillation or other volatilizing methods. The final hardening always results in some further condensation, and even if every trace of free water is removed from the intermediate product there is usually sufficient water formed during the final hardening to result in an opaque, turbid product, due, of course, to the non-homogeneity of the structure in the presence of the small bubbles caused by steam formation. For many purposes turbid products do not present any disadvantages, especially when final products are prepared with opaque fillers, but for many purposes, for example in the imitation of jewelry, in the production of the so-called non-breakable glass substitutes, in the production of transparent fountain pen barrels and similar articles, a high transparency or translucency is of prime importance.

It has been proposed in the past to prevent the production of turbidity by adding organic solvents such as alcohols or caustic alkalis or carbonates, or in some cases strong mineral acids such as sulfuric acid. All of these attempts to produce the desired transparency or translucency have been attended by serious disadvantages as to cost of production, and particularly because the treatment seriously affects the physical characteristics of the products such as its mechanical strength, hardness, solidity, and the like, and the use of strong alkalis or other powerful inorganic electroyltes results in considerable darkening of the product, especially in phenol aldehyde condensation products.

The present invention prevents the formation of turbidity by the addition of a new group of substances to the condensation products after removing most or all of the free water before the latter are hardened. These substances possess sufficient affinity for water to prevent or minimize turbidity. The substances used in the present invention are aromatic or aliphatic polycarboxylic and especially diacarboxylic acids, anhydrides, acid or neutral salts, or mixtures, especially acid salts of the alkali and alkaline earth metals. In the process of the present invention the salts of the polycarboxylic acids appear to be the important hygroscopic agents, and for many cases it is preferable to add the salt, and especially the acid alkali metal salts in a preformed state. The invention, however, is not limited to this procedure and especially where alkaline condensing agents have been used the acids, or even their anhydrides may be added and will react with the alkaline condensing agent forming more or less of the salts in situ.

While it is often desirable to have present a major portion of the polycarboxylic acid compounds in the form of salts, in some cases the presence of some free polycarboxylic acid in the final product may be provided especially where the products are dyed or where they are relatively sensitive to darkening. In such cases the presence of a small excess of the free polycarboxylic acid appears to have a desirable effect, possibly due to its assurance that no free alkali remains as the alkalis tend to produce discoloration when present in sufficient quantities and the presence of free acid improves the fixation of certain dyes. It is also of course possible that a small excess of free polycarboxylic acid reacts chemically with some of the constituents of the condensation product to produce a beneficial result, A large number of polycarboxylic acids may be used effectively, and the present invention is not limited to any particular members. Examples of typical polycarboxylic acids which may be used in the present invention are aromatic dicarboxylic acids and their anhydrides, such as phthalic acid, naphthalic acid, diphenic acid, and their homologues and substitution products. Phthalic acid appears to be especially effective. Aliphatic polycarboxylic acids are also of importance, such as maleic and fumaric acid, malic acid, succinic acid, the various tartaric acids, and particularly mesotartaric acid, adipic acid, and the like. In some cases it is advantageous to employ mixtures containing both mono- and polycarboxylic acid compounds and processes using such mixture are included in the invention.

The invention will be described in greater detail in connection with the following specific examples, which illustrate a few representative embodiments of the invention.

Example 1.

1,000 parts of phenol are caused to react with 1,000 parts of formaldehyde in the form of a 40% solution, 2 parts of sodium carbonate being used as a condensing agent. From 50 to 100 parts of sodium or potassium acid phthalate or naphthalate are then homogeneously incorporated and most or all of the free water is then expelled for example by volatilization, and the residue hardened in the usual manner, resulting in a product showing remarkable freedom from turbidity.

Example 2.

2,000 parts of a phenol furfural resin are prepared, 20 to 40 parts of sodium carbonate being used as a condensing agent, or smaller amount of caustic alkali may be used but care should be taken to prevent excessive reaction which might result in a discolored product. From 50 to 120 parts of diphenic acid are then thoroughly incorporated, the free water removed and the product hardened.

Instead of using diphenic acid corresponding amounts of phthalic or naphthalic acid may be used.

Example 3.

2,000 parts of a cresol formaldehyde resin are prepared as described in Example 1, using from 2 to 5 parts of sodium or potassium carbonate as a condensing agent. 60 to 90 parts of sodium acid maleate or neutral sodium fumerate or a mixture are then homogeneously incorporated, the free water expelled and the product hardened.

Corresponding amounts of sodium succinate or mezotartarate may be substituted for the sodium maleate, or a somewhat smaller quantity of alkaline earth metal salts of the acids may be used.

Example 4.

2,000 parts of a formaldehyde urea resin are prepared in the usual manner, using from 2 to 10 parts of a mild alkaline condensing agent. 70 to 100 parts of an acid alkali metal adipate are then homogeneously incorporated, the free water expelled and the product hardened.

If desired the alkali metal adipate may be partly or wholly replaced by equivalent amounts of an aromatic polycarboxylic salt such as an alkali metal acid phthalate or naphthalate.

In the claims the expression polycarboxylic acid compound will be used as a generic term to cover polycarboxylic acids, their anhydrides and salts, both neutral and acid.

What is claimed as new is—

1. A method of producing hard, infusible, relatively nonturbid, aldehyde condensation products, which comprises bringing about reaction in the presence of an alkaline condensing agent between an aldehyde and a resinophoric compound capable of reacting therewith to produce a resin which can be hardened by heat, adding a polycarboxylic acid compound thereto, substantially removing free water present and subjecting the product to hardening by heat without substantially removing the polycarboxlyic acid compound.

2. A method of producing a hard, infusible, relatively nonturbid, phenol aldehyde condensation product, which comprises bringing about reaction between a phenol and an aldehyde in the presence of an alkaline condensing agent, adding thereto a polycarboxylic acid compound, substantially removing free water and hardening the product by heat without substantially removing the polycarboxylic acid compound.

3. A method of producing a hard, infusible, relatively nonturbid, phenol formaldehyde condensation product, which comprises bringing about reaction between a phenol and formaldehyde in the presence of an alkaline condensing agent, adding thereto a polycarboxylic acid compound, substantially removing free water and hardening the product by heat without substantially removing the polycarboxylic acid compound.

4. A method of producing hard, infusible, relatively nonturbid, aldehyde condensation products, which comprises bringing about reaction in the presence of an alkaline condensing agent between an aldehyde and a resinophoric compound capable of reacting therewith to produce a resin which can be hardened by heat, adding a dicarboxylic acid compound thereto, substantially removing free water present and subjecting the product to hardening by heat without substantially removing the dicarboxylic acid compound.

5. A method of producing a hard, infusible, relatively nonturbid, phenol aldehyde con densation product, which comprises bringing about reaction between a phenol and an aldehyde in the presence of an alkaline condensing agent, adding thereto a dicarboxylic acid compound, substantially removing free water and hardening the product by heat without substantially removing the dicarboxylic acid compound.

6. A method of producing a hard, infusible, relatively nonturbid, phenol formaldehyde condensation product, which comprises bringing about reaction between a phenol and formaldehyde in the presence of an alkaline condensing agent, adding thereto a dicarboxylic acid compound, substantially removing free water and hardening the product by heat without substantially removing the dicarboxylic acid compound.

7. A method of producing hard, infusible, relatively nonturbid, aldehyde condensation products, which comprises bringing about reaction in the presence of an alkaline condensing agent between an aldehyde and a resinophoric compound capable of reacting therewith to produce a resin which can be hardened by heat, adding an aromatic dicarboxylic acid compound thereto, substantially removing free water present and subjecting the product to hardening by heat.

8. A method of producing a hard, infusible, relatively nonturbid, phenol aldehyde condensation product, which comprises bringing about reaction between a phenol and an aldehyde in the presence of an alkaline condensing agent, adding thereto an aromatic dicarboxylic acid compound, substantially removing free water and hardening the product by heat.

9. A method of producing a hard, infusible, relatively nonturbid, phenol formaldehyde condensation product, which comprises bringing about reaction between a phenol and formaldehyde in the presence of an alkaline condensing agent, adding thereto an aromatic dicarboxylic acid compound, substantially removing free water and hardening the product by heat.

10. A method of producing hard, infusible, relatively nonturbid, aldehyde condensation products, which comprises bringing about reaction in the presence of an alkaline condensing agent between an aldehyde and a resinophoric compound capable of reacting therewith to produce a resin which can be hardened by heat, adding a phthalic acid compound thereto, substantially removing free water present and subjecting the product to hardening by heat.

11. A method of producing a hard, infusible, relatively nonturbid, phenol aldehyde condensation product, which comprises bringing about reaction between a phenol and an aldehyde in the presence of an alkaline condensing agent, adding thereto a phthalic acid compound, substantially removing free water and hardening the product by heat.

12. A method of producing a hard, infusible, relatively nonturbid, phenol formaldehyde condensation product, which comprises bringing about reaction between a phenol and formaldehyde in the presence of an alkaline condensing agent, adding thereto a phthalic acid compound, substantially removing free water and hardening the product by heat.

13. A method of producing hard, infusible, relatively nonturbid, aldehyde condensation products, which comprises bringing about reaction in the presence of an alkaline condensing agent between an aldehyde and a resinophoric compound capable of reacting therewith to produce a resin which can be hardened by heat, adding a salt of a polycarboxylic acid and an alkali forming metal thereto, substantially removing free water present and subjecting the product to hardening by heat.

14. A method of producing a hard, infusible, relatively nonturbid, phenol aldehyde condensation product, which comprises bringing about reaction between a phenol and an aldehyde in the presence of an alkaline condensing agent, adding thereto a salt of a polycarboxylic acid and an alkali forming metal, substantially removing free water and hardening the product by heat.

15. A method of producing a hard, infusible, relatively nonturbid, phenol formaldehyde condensation product, which comprises bringing about reaction between a phenol and formaldehyde in the presence of an alkaline condensing agent, adding thereto a salt of a polycarboxylic acid and an alkali forming metal, substantially removing free water and hardening the product by heat.

16. A method of producing hard, infusible, relatively nonturbid, aldehyde condensation products, which comprises bringing about reaction in the presence of an alkaline condensing agent between an aldehyde and a resinophoric compound capable of reacting therewith to produce a resin which can be hardened by heat, adding a salt of an aromatic dicarboxylic acid and an alkali forming metal thereto, substantially removing free water present and subjecting the product to hardening by heat.

17. A method of producing a hard, infusible, relatively nonturbid, phenol aldehyde condensation product, which comprises bringing about reaction between a phenol and an aldehyde in the presence of an alkaline condensing agent, adding thereto a salt of an aromatic dicarboxylic acid and an alkali forming metal, substantially removing free water and hardening the product by heat.

18. A method of producing a hard, infusible, relatively nonturbid, phenol formaldehyde condensation product, which comprises bringing about reaction between a phenol and formaldehyde in the presence of an alkaline condensing agent, adding thereto a salt of an aromatic dicarboxylic acid and an alkali forming metal, substantially removing free water and hardening the product by heat.

19. A method according to claim 4 in which the dicarboxylic acid compound is a phthalate of an alkali forming metal.

20. A method according to claim 5, in which the dicarboxylic acid compound is a phthalate of an alkali-forming metal.

21. A method according to claim 6, in which the dicarboxylic acid compound is a phthalate of an alkali-forming metal.

Signed at Pittsburgh, Pennsylvania, this 10th day of March, 1928.

ROBERT AMES NORTON.